US012275623B2

(12) United States Patent
Mann

(10) Patent No.: US 12,275,623 B2
(45) Date of Patent: Apr. 15, 2025

(54) LIFTING APPARATUS

(71) Applicant: David Mann, Memmingen (DE)

(72) Inventor: David Mann, Memmingen (DE)

( * ) Notice: Subject to any disclaimer, the term of this patent is extended or adjusted under 35 U.S.C. 154(b) by 50 days.

(21) Appl. No.: 17/593,636

(22) PCT Filed: Mar. 17, 2020

(86) PCT No.: PCT/DE2020/100207
§ 371 (c)(1),
(2) Date: Sep. 22, 2021

(87) PCT Pub. No.: WO2020/192838
PCT Pub. Date: Oct. 1, 2020

(65) Prior Publication Data
US 2022/0017337 A1 Jan. 20, 2022

(30) Foreign Application Priority Data
Mar. 22, 2019 (DE) ..................... 10 2019 002 039.1

(51) Int. Cl.
*B66C 23/00* (2006.01)
*B66C 5/02* (2006.01)
(Continued)

(52) U.S. Cl.
CPC .............. *B66C 23/18* (2013.01); *B66C 5/025* (2013.01); *B66C 23/42* (2013.01); *B66C 23/701* (2013.01);
(Continued)

(58) Field of Classification Search
CPC ....... B66C 23/18; B66C 23/185; B66C 23/26; B66C 23/42; B66C 23/66; B66C 23/68;
(Continued)

(56) References Cited

U.S. PATENT DOCUMENTS 2,625,275 A 1/1953 Ashton
3,140,857 A 7/1964 Nickles
(Continued)

FOREIGN PATENT DOCUMENTS

CN 111094169 A * 5/2020 ............. B66C 23/68
DE 2246323 A1 4/1973
(Continued)

OTHER PUBLICATIONS

International Search Report and Written Opinion for PCT/DE2020/100207 Jul. 24, 2020.

*Primary Examiner* — Emmanuel M Marcelo
(74) *Attorney, Agent, or Firm* — Aird McBurney LP

(57) ABSTRACT

A lifting device (1, 14, 18, 28, 31, 36, 46, 50) has three booms (2, 19) of adjustable length, which in each case have a first end section (4, 20) and a second end section (5, 21) opposite the first end section (4, 20). While the first end sections (4, 20) of all booms (2, 19) are articulatedly connected to one another, the second end sections (5, 21) are articulatedly and rotatably mounted in respective bearings (7, 24, 29). The bearings (7, 24, 29) are thereby arranged at fixed positions relative to one another. Furthermore, in each boom (2, 19) at least the first end section (4, 20) can be rotated about the longitudinal axis of the boom (2, 19) with respect to the second end section (5, 21). In particular, the booms (2, 19) always form a tripod, which is characterized by a high stability. The lifting device (1, 14, 18, 28, 31, 36, 46, 50) is therefore suitable for lifting very heavy loads, wherein greater ranges can be achieved compared to known lifting devices. In addition, the lifting device (1, 14, 18, 28, 31, 36, 46, 50) can be pivoted further than known lifting devices.

18 Claims, 12 Drawing Sheets

(51) Int. Cl.

| | |
|---|---|
| ***B66C 23/18*** | (2006.01) |
| ***B66C 23/42*** | (2006.01) |
| ***B66C 23/70*** | (2006.01) |
| ***B66C 23/74*** | (2006.01) |
| ***B66C 23/78*** | (2006.01) |

(52) U.S. Cl.
CPC .............. *B66C 23/74* (2013.01); *B66C 23/78* (2013.01); *B66C 23/185* (2013.01)

(58) Field of Classification Search
CPC ....... B66C 23/701; B66C 23/74; B66C 23/76; B66C 23/78; B66C 5/025
See application file for complete search history.

(56) References Cited

U.S. PATENT DOCUMENTS

| | | | | | |
|---|---|---|---|---|---|
| 3,263,232 | A * | 7/1966 | Burwell | H01Q 15/162 343/765 |
| 4,218,045 | A | 8/1980 | Weismann | |
| 4,997,152 | A * | 3/1991 | Wagman | B66C 5/025 248/188.5 |
| 5,613,658 | A * | 3/1997 | Rogelja | A62B 1/06 248/163.1 |
| 6,056,273 | A * | 5/2000 | Smith | B66C 5/025 254/335 |
| 7,066,343 | B1 * | 6/2006 | Khachaturian | B66C 19/02 212/270 |
| 7,086,820 | B1 * | 8/2006 | Blake | B66C 23/18 212/176 |
| 7,543,790 | B2 * | 6/2009 | Starcher | A47B 97/08 248/463 |
| 10,611,607 | B1 * | 4/2020 | Williams | B66D 3/02 |
| 2001/0032972 | A1 * | 10/2001 | Fillisetti | B66C 5/025 254/334 |
| 2012/0175333 | A1 * | 7/2012 | Pech | B66C 23/26 212/177 |

FOREIGN PATENT DOCUMENTS

| | | | | |
|---|---|---|---|---|
| DE | 102011010042 A1 * | 8/2012 | B66C 5/025 |
| JP | 2012062200 A * | 3/2012 | B66C 23/70 |
| WO | WO-9916695 A1 * | 4/1999 | B66C 23/185 |
| WO | WO-2012080455 A1 * | 6/2012 | B66C 23/36 |

* cited by examiner

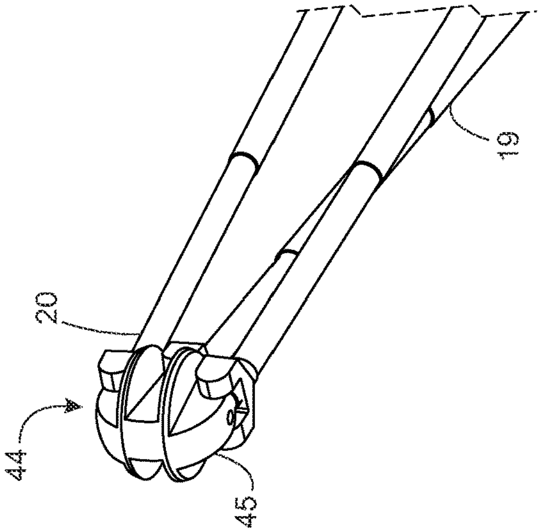
Fig. 9
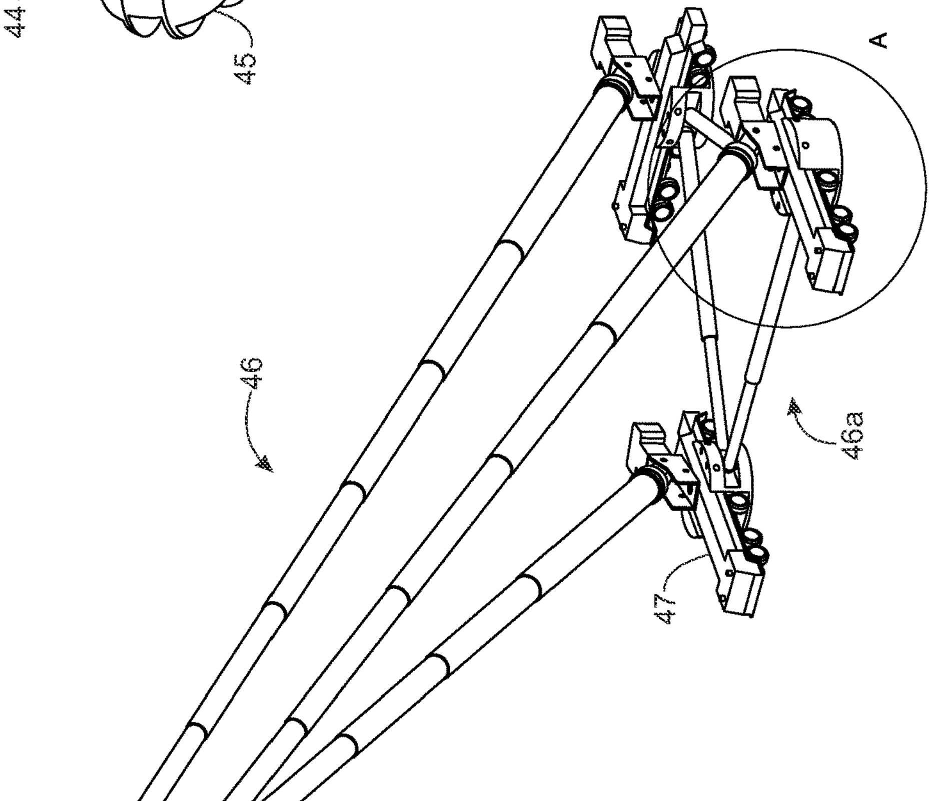
Fig. 10
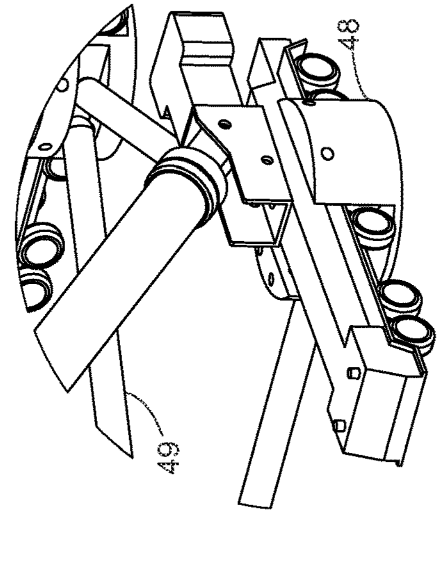
A (2 : 2.5)

LIFTING APPARATUS

The present invention relates to a lifting device with booms of adjustable length, which in each case have a first end section and a second end section opposite the first end section, wherein the second end section is articulatedly and rotatably mounted in a bearing. The lifting device is in particular a crane.

In construction, a wide variety of lifting devices or cranes are used for lifting heavy loads. To increase the maximum load-carrying capacity of lifting devices it is known to combine several booms with one another.

Thus, DE 10 2012 210 112 B3 discloses, for example, a mobile telescopic crane, which has a length-adjustable boom with at least three partial booms. Each of the partial booms can be extended in the longitudinal direction and is constructed from at least two partial boom sections. Partial boom sections arranged transversely to the longitudinal direction at a distance from one another form in each case one boom section with at least one flexurally rigid connecting element. The boom is articulated to the upper structure with two partial booms. By means of this design of the boom, an increase in the load-carrying capacity is achieved by increasing the surface moments of inertia of the boom.

In addition, an extendible crane boom is known in frame design from DD 95 449 A5, which has two partial booms arranged adjacent to one another. These are connected to one another via flexurally rigid carriers.

In the case of these known lifting devices, indeed a certain increase in load-carrying capacity can be achieved. However, the outreach or range remain substantially unchangeable up to which heavy loads can be moved with the lifting devices. In addition, in the case of these known lifting devices, the booms are limited in their pivotability, since they can only be tilted within a polar angle range of 0° to 90°.

The problem addressed by the present invention is therefore to create a lifting device for lifting very heavy loads, with which loads can be moved over greater distances compared to known lifting devices and which can also be pivoted over larger angular ranges than known lifting devices.

This problem is solved by a lifting device and by a method having the features of the independent claims. Preferred embodiments are the subject matter of the dependent claims.

In contrast to known lifting devices, the lifting device of the present invention has three booms with an adjustable length, in which, on the one hand, the first end sections of all booms are connected articulatedly with one another and in which, on the other hand, the second end sections are mounted articulatedly and rotatably in respective bearings. For each boom or second end section a respective individual bearing is therefore provided, in which each boom or second end section can be individually moved or tilted and rotated. All bearings are thereby arranged relative to one another at fixed positions, wherein they are preferably spaced apart from one another. In other words, the positions of the preferably spaced apart bearings are unchangeable or rigid or fixed relative to one another. Because the first end sections are connected to one another and the positions of the bearings are fixed relative to one another, the lifting device always assumes the shape of a tetrahedron, the surfaces of which are delimited or enclosed by the booms and connecting lines between the bearings. Although the lifting device can take in particular the form of a regular or symmetrical tetrahedron, when the lifting device is pivoted, its shape is subject to changes. The lifting device therefore for the most part assumes an irregular or unsymmetrical or asymmetrical or irregular or oblique tetrahedral shape in practical use. In the aforementioned special case of a regular or symmetrical tetrahedron, the three booms of the lifting device form a so-called tripod or three-footed tripod or three-legged tripod, as it is known, for example, from stands with three tripod legs, in which, however, in contrast to the lifting device according to the invention end sections of the tripod legs that are not connected to one another are neither articulatedly nor rotatably mounted. In addition, in contrast to the lifting device according to the invention stands always have a highly symmetrical basic structure for static reasons. Such a tripod is characterized above all by a high stability, whereby the lifting device is particularly stable overall. Furthermore, in each boom of the lifting device according to the invention at least the first end section can be rotated relative to the second end section about the longitudinal axis of the boom. In other words, the first end section of each of the booms has a rotational degree of freedom about the longitudinal axis of the respective boom. Each of the booms is therefore designed to be rotatable in itself. To ensure a maximum mobility or pivotability of the lifting device, each of the first end sections can be rotated in any rotational direction and through any angle, including a full circle about the longitudinal axis of the respective boom.

The booms of the lifting device according to the invention are only loaded when lifting loads by tensile and compressive forces due to their special construction, but not by bending forces. Overall, this results in a very high overall rigidity for the lifting device of the present invention. Also for this reason the lifting device is overall substantially more stable and thus considerably more resilient than a lifting device with only one boom, which consists of a similar material and has similar dimensions as the booms of the lifting device according to the invention. For these reasons, not only substantially heavier loads can be lifted with the lifting device according to the invention than with known lifting devices. As a result of the higher stability and higher resilience, the booms of the lifting device can rather be extended to their greatest possible length even with heavy loads, so that heavy loads are movable or can be moved over further distances than with known lifting devices. In addition, because not only the first end sections are articulatedly connected to one another, but rather also the second end sections are mounted articulatedly and rotatably in respective bearings and because the first end sections can also be rotated relative to the second end sections of respective booms, a pivotability or mobility of the lifting device according to the invention is achieved in interaction with the variable length or the length adjustability of the booms, which is possible neither in the case of tripods nor in the case of known lifting devices. In particular, as a result of the interaction between the booms, or their length adjustability, their articulated connection and articulated mounting in separate bearings and the rotatability of the first end sections relative to the respective second end sections of respective booms, a forced guidance of the respective two other booms occurs in the lifting device when the length of one of the booms is changed. Thus, a spatial rotation of the entire system of the lifting device consisting of all three booms can be brought about by a mere change in the length of only one of the booms.

In this connection, the length adjustability of the booms can be achieved, for example, in that the booms are constructed similarly to a telescope from sub-elements displaceable one inside the other, so that the booms can be telescopically shortened or lengthen by pushing the sub-elements inside one another or pulling them apart.

Particularly preferably, at least one of the booms can be rotated about a first axis as well as about a second axis rotatable about the first axis, wherein the first axis and the second axis intersect or are skewed with respect to one another, or at least one of the booms is designed so as to be rotatable both about a first axis as well as about a second axis rotatable about the first axis, wherein the first axis and the second axis intersect or are designed so as to be skewed with respect to one another. If the first axis and the second axis intersect, they are preferably perpendicular to one another or they are normal to one another for reasons of stability. The first axis is thereby preferably oriented perpendicularly or vertically, while the second axis is preferably oriented level or horizontally. As a result of this special rotatability of the boom about the first as well as about the second axis, in the lifting device of the present invention, the length-adjustable booms are almost unrestrictedly movable in space and can be pivoted much further than is the case with known lifting devices. In particular, in embodiments of the lifting device, in which each of the booms is rotatable both about a respective first axis as well as about a respective second axis, each of which can in turn be rotated about the respective first axis, the first end sections connected with one another are movable within a polar angular range of almost −90° to +90° and within an azimuthal angular range comprising 360°. In such an embodiment, the lifting device is characterized by a maximum possible pivotability or mobility. Each of the booms can thereby be rotated in particular both about a respective one of three first axes parallel to one another as well as about a respective second axis lying in a respective plane, each of which in turn can be rotated about a respective one of the first axes. When rotating about the respective first axis, the second axes remain preferably within their respective plane or they do not exit from this plane. Because the first axes are parallel to one another, each of the planes, in which the second axes lie, is penetrated by the first axes at three points, which, connected to one another, form a triangle within one of the planes. Two of the second axes can also be located in the same plane and the third of the second axes in a plane different from this plane. In addition or alternatively, the second axes can all be located within one or the same plane and/or can be movable within one or the same plane. For example, all of the first axes can be arranged vertically and parallel to one another, while all of the second axes can be located and/or can be movable within a single horizontal plane, to which the first axes form normals.

The individual bearings can either all be designed the same or differently. In particular, the bearings can be ball bearings.

In general, the lifting device can be arranged on a subsurface and can thereby be fixed to said subsurface or the lifting device can be designed so as to be mobile. The subsurface is usually the ground, on which the lifting device is set up or placed and supports said lifting device. In a mobile design, the lifting device can be easily moved to another location.

There are a wide variety of options for fixing the bearings in mutually unchangeable positions. For example, at least one of the bearings can be anchored or become anchored in the ground. In particular, one of the bearings can be designed so as to be stationary, while the respective other two bearings can be movable about this stationary bearing. Of course, two or all of the bearings can also be anchored or become anchored in the ground.

Furthermore, at least two of the bearings can be or become connected to one another. For example, this can take place by means of an elongated element, which serves not only as a connecting element for the bearings, but rather at the same time also as a stabilizing element for the entire lifting device. It is also possible here to connect all of the bearings to each other by means of such connecting elements.

Furthermore, at least two of the bearings can be or can become arranged or fixed or anchored on the same base, but all of the bearings can also be or can become arranged or fixed or anchored on the same base. This base can be a suitable foundation, such as, for example, a concrete slab or a concrete base. In this way, two or all of the bearings can be designed as a compact component or construction element or can be integrated within such a component or construction element.

In addition, at least two of the bearings or all of the bearings can be or can become arranged at different heights. As a rule, the heights are determined by the in each case prevailing terrain profiles at the location where the lifting device is used.

However, particularly preferably at least one of the booms and/or one of the bearings is a part at least of one vehicle or is at least one vehicle or is provided as such. In particular, the vehicle can be a self-driving vehicle, which can have a motor. An upper structure of the vehicle can be designed or provided as a respective bearing for one of the second end sections. Furthermore, it is possible to provide three different or individual vehicles, the respective upper structure of which serves as a bearing for respective booms or their second end sections. In addition, within the same lifting device one or two vehicles can be provided with an upper structure and an undercarriage, while at the same time one or two vehicles are provided without an upper structure in the lifting device. Particularly preferably, the vehicles are vehicle cranes, so that in a particularly preferable embodiment of the method according to the invention a vehicle crane boom is provided for at least one of the booms. In summary, the lifting device as such can be designed in this way as a mobile lifting device or as a vehicle or in particular as a self-driving vehicle.

Upper structures of known vehicles, and, in particular, upper structures of vehicle cranes, are usually equipped with a lifting cylinder for the lift adjustment of booms and with a rotary drive with a toothed ring, which enables a rotation of the boom about a perpendicular axis. Such a rotation of the boom is possible, as a rule, about a full circle. If the lifting device now has at least one such upper structure, because, for example, a known vehicle crane has been integrated into the lifting device or three individual known vehicle cranes have been connected or coupled to a lifting device, a separation or decoupling of the boom mounted in the upper structure or all of the booms from this lift adjustment and from the rotary drive or from its toothed ring is advantageous. As a result of the separation or decoupling of the boom or the booms from the lift adjustment and from the rotary drive, the above-mentioned forced guidance of the other booms can take place unhindered in the event of a change in length of one of the booms.

In principle, the first end sections are designed in such a manner that they are connectable or are connected directly to one another. In addition, the first end sections can be connected detachably or non-detachably to one another or to a coupling means. In this connection, a lifting device is preferred with at least one coupling means, which articulatedly connects the first end sections with one another, wherein at least one of the first end sections is detachably connected to the coupling means. However, two or all of the first end sections can also be detachably connected or become connected to the coupling means. Due to the detachable connection, if necessary, the coupling means can be separated from the booms or the first end sections and can be used elsewhere. By means of such a coupling means, conventional lifting devices, such as already existing cranes or mobile cranes can advantageously also be connected in a simple manner to form a lifting device according to the invention.

In order to ensure the maximum pivotability of the lifting device, the coupling means of a special embodiment preferably has at least three sub-elements arranged successively along an axis of rotation and rotatable about the same, wherein in each case one of the first end sections is articulatedly connected to a respective one of the sub-elements.

As a rule, cranes have guide devices with deflection rollers for carrying cables. Correspondingly, in the case of the lifting device according to the invention, preferably at least one guide device is also provided for at least one carrying cable. The guide device can have at least one deflection roller. In order now to ensure a free pivotability of such a lifting device, the guide device is advantageously rotatably mounted on the coupling means.

Advantageously, the lifting device has at least one stabilizing device, wherein the stabilizing device has at least one basic element with a longitudinal axis, which in a substantially horizontal orientation can be connected to at least one of the bearings, and at least one connecting means for detachably connecting the basic element to the bearing. According to an embodiment of the method according to the invention, the bearing is connected to at least one stabilizing device, which has at least one basic element with a longitudinal axis and at least one connecting means for detachably connecting the basic element to the bearing, wherein the basic element is substantially horizontally oriented. In this connection, the horizontally oriented basic element, the longitudinal axis of which is substantially horizontally oriented, can rest on a subsurface bearing the lifting device or the bearings, such as, for example, the ground or be supported or spaced apart from this subsurface. As a result of the horizontal orientation of the basic element, depending on the length of the basic element, an enlargement of the contact surface or support base of the bearing or of the lifting device when supported by the subsurface can be achieved, which can exceed the contact surface of the actual lifting device by many times over.

Correspondingly, the stability of the lifting device and in particular that of mobile lifting devices is also increased. The stability of lifting devices with basic elements spaced apart from the subsurface can also be increased, since an additional structural stiffening or rigidity of the lifting device can be achieved by suitably connecting the basic element to the bearing.

In particular, the comparatively simple design of the stabilizing device thereby proves to be advantageous. Thus, in the simplest case the stabilizing device can have only an elongated basic body and a connecting means, with which the basic element can be connected, for example, with one end, to one of the bearings. In the connected state, the basic element can extend away from the lifting device. Thus, the support base above all of mobile lifting devices is enlarged, since there are now additional contact surfaces.

Because the connecting means and/or the basic element is also designed to produce a detachable connection between the basic element and one of the bearings of the lifting device, it is possible to use the stabilizing device only when necessary and to connect it only to one bearing of the lifting device when particularly high loads on the lifting device are to be expected. Otherwise, the stabilizing device can be transported separately from the bearing in a convenient and space-saving manner. The connecting means can thereby be designed as a fixed component of the basic element or the connecting means can be part of the basic element or the basic element can have the connecting means or the connecting means can be designed as a component separate from the basic element.

The basic element can be made of different materials. For example, the basic element can consist at least partially or completely of a stable metal or plastic.

The possibility of further stabilizing the lifting device by providing additional ballast proves to be a further advantage of a lifting device with a stabilizing device. Particularly preferably, the lifting device therefore has at least one ballast body or weight body, which is provided to be arranged on the basic element, or has at least one ballast body or weight body, which is provided to be arranged on the basic element and to be displaceable along the basic element to different positions. If the weight body can be arranged at different positions on the basic element because it is designed, for example, so as to be displaceable or movable along the basic element, an optimized balancing of the stabilizing device is possible, so that loads to be expected of the lifting device can be counteracted as best as possible. In particular, the weight body can be functionally integrated with the basic element or the stabilizing device and form a functional part of the basic element or the stabilizing device. Thus, for example, a connecting element connecting two or more basic elements can be provided at the same time as a functionally integrated weight body.

Furthermore, the weight body can be designed so as to be separable from the basic element or the stabilizing device. For example, the stabilizing device can have a folding support with a foldable shelf for the weight body. Such a folding support can be designed so as to be displaceable along the elongated basic element or can be fixedly attached or fixed on the basic element. If there are two or more such folding supports, elongated weight bodies can also be supported with said folding supports, which weight bodies are supported in respective sections of the shelves and otherwise extend between the shelves of the folding supports.

Preferably, the basic element is designed as a lattice structure, in particular in the manner of a framework or as a framework lattice and/or the basic element has a hollow interior and/or the basic element has a straight or a curved shape. By means of a lattice structure or a framework lattice, a mechanically particularly stable and at the same time lightweight design of the basic element can be realized. Correspondingly, a hollow interior of the basic element contributes to a weight reduction. In addition, such a cavity can be used as a storage space for various tools and materials not only during the transport of the the stabilizing device or the lifting device, but rather also for accommodating weight bodies. While a straight basic body is characterized by an as small as possible material requirement with the greatest possible extension, the stabilizing device with basic elements, which have a curved shape, can be adapted to local ground conditions at the location where the lifting device is used.

Particularly preferably, the lifting device has a stabilizing device with at least one housing body arranged on the basic element, in which housing body the connecting means is accommodated in a state of rest and from which the connecting means can be at least partially or completely extended or folded out. In contrast to the stabilizing devices, in which the connecting means is always designed so as to be exposed, such a stabilizing device can be transported in a particularly space-saving and convenient manner, if the connecting means is accommodated in the housing body in a state of rest. The housing body can thereby be fixedly attached to the basic element or can be displaceable along the same and can be fixed at different positions.

In principle, the basic element can be oriented in such a manner that its longitudinal axis is substantially parallel to a longitudinal axis or a transverse axis of a bearing, for example, of an undercarriage or that its longitudinal axis forms an angle with the longitudinal axis of the bearing. In the case of a mobile lifting device, with reference to the direction of travel, which as a rule coincides with the longitudinal axes of the bearing, the basic element can be arranged in front of or behind the bearing, wherein the longitudinal axis of the basic element can extend parallel to the transverse axis of the bearing. On the other hand, the basic element can also be arranged on the left and right of the bearing or undercarriage with respect to the direction of travel, wherein the longitudinal axis of the basic element can extend parallel to the longitudinal axis of the bearing or undercarriage. In addition, the basic element can be oriented in such a manner that its longitudinal axis is parallel neither to the longitudinal—nor to the transverse axis of the bearing, but rather forms respective angles with them. Usually, a basic element oriented in this way extends from a corner of the bearing.

Many embodiments of the stabilizing device have more than one basic element, which can be arranged, depending on the requirements of the respective use and the lifting device, relative to one another in different ways. Thus, longitudinal axes of at least two basic elements can be aligned parallel to one another or at an angle to one another or can be arranged at different heights. Two basic elements with longitudinal axes parallel to one another can be arranged, for example, with respect to the direction of travel of a mobile lifting device, on the the left and right of one of the bearings or in front of or behind the bearing. In the first case, the longitudinal axes of the basic elements are preferably oriented parallel to the longitudinal axis of the bearing, while in the second case they are preferably oriented to the transverse axis of the bearing. However, the mutually parallel longitudinal axes of the basic elements also enclose respective angles with the longitudinal axis or the transverse axis of the bearing. In particular, with regard to the direction of travel of the lifting device, two first basic elements can be provided both in front of and behind the bearing as well as on the right and left of the bearing, wherein the longitudinal axes of the first basic elements are oriented parallel to the transverse axis of the bearing and the longitudinal axes of the second basic elements are oriented parallel to the longitudinal axis of the bearing.

Furthermore, a respective basic element can extend from a front left and a right corner of the bearing and from a rear left and right corner of the bearing, the longitudinal axis of which is neither parallel to the longitudinal—nor the transverse axis of the bearing, but rather forms respective angles with them. The angles, which form the longitudinal axes of the respective basic elements with the longitudinal- and transverse axis of the bearing can be different for each of the basic elements.

With basic elements, the longitudinal axes of which are at different heights, a type of passage for personnel can also be formed, which can be advantageous in particular in the case of stabilizing devices, the basic elements of which enclose a bearing in a frame-like manner.

Preferably, the angle, at which the longitudinal axes of the basic elements are aligned to one another, can be changed or adjusted. Thus, a greater flexibility of the stabilizing device is achieved with regard to different conditions when using the lifting device and different forms of terrain at the location of use. In principle, the angle between the longitudinal axes of the basic elements can be an acute, obtuse or right angle.

Advantageously, at least one of the booms is pretensioned or spatially pretensioned or all of the booms are pretensioned or spatially pretensioned. This can be done, for example, by twisting one of the booms or all of the booms. If there is a hydraulic cylinder for the lift adjustment of the boom, such a pretensioning can also be generated by means of the hydraulic cylinder. Accordingly, in the case of the lifting device, at least one of the booms is designed so as to be pretensionable or all of the booms are designed so as to be pretensionable. By means of the pretensioning of at least one of the booms, an optimization of the overall rigidity of the system of the lifting device is possible, specifically both in the static as well as in the dynamic state. In particular, a bending of the booms can be counteracted with pretensioning and a kinking of the booms under heavy loads can be prevented.

The invention is elucidated below in detail by means of preferred embodiments with the aid of figures.

FIG. 9 shows a coupling unit with rotatable sub-elements;

FIG. 10 shows a lifting device with a stabilizing device for vehicle cranes;

Figure 1:
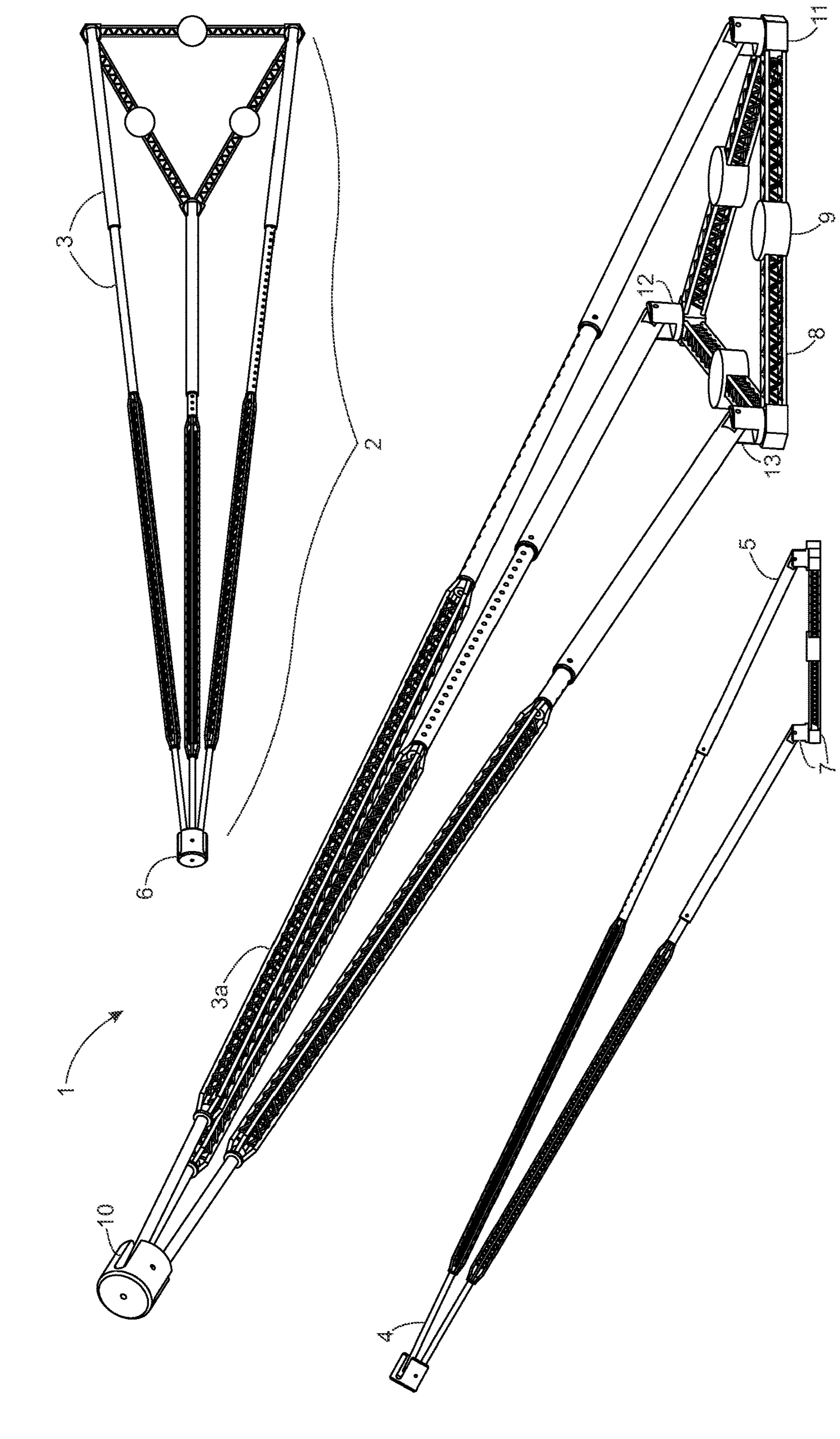
FIG. 1 shows a lifting device.

A first embodiment of a lifting device 1 is shown in FIG. 1 in a side view, in a top view and in a spatial illustration. Although the lifting device 1 is intended for a use as a crane, components typical of a crane such as a carrying cable or lifting cable and associated rollers or deflection rollers are not shown in the figure for better illustration of its essential components.

The lifting device 1 has three elongated booms 2 with telescopic elements 3, which can be moved telescopically into one another, wherein in each case one of the telescopic elements 3 of each boom 2 is additionally provided with a fixed lattice jib 3*a*. When the telescopic elements 3 are pushed inside one another or pulled apart from one another, an overall length of the booms 2 is correspondingly changed or the length of the booms 2 can be set or adjusted by displacing the telescopic elements 3 relative to one another. In addition, the telescopic elements 3 of the booms 2 are designed so as to be rotatable relative to each other about a longitudinal axis of the respective boom 2, so that each boom 2 is rotatable in itself. Each of the booms 2 has a first end section 4 connected to the fixed lattice jib 3*a* and a second end section 5 opposite the first end section. When the telescopic elements 3 are rotated relative to one another, the respective first end sections 4 and the second end sections 5 of a respective boom 2 are also rotated relative to one another. While the first end sections 4 of all booms 2 are articulatedly connected with one another by means of a coupling element or coupling means 6, the second end sections 5 are articulatedly and rotatably mounted in respective bearings 7. The bearings 7 in the embodiment shown of the lifting device 1 are thereby arranged at corners of an equilateral triangle and are connected to one another by elongated, lattice-shaped stabilizing elements 8 resting on the subsurface. As a result of the stabilizing elements 8 connecting the bearings 7, the positions of the three bearings relative to one another are unchangeable or fixed or rigid. Ballast- or weight bodies 9 are also arranged on the stabilizing elements 8 for the additional stabilization of the lifting device 1.

The coupling means 6 has substantially a cylindrical outer form. Three recesses 10 are formed at equal angular distances in the coupling means 6. In each of the recesses 10 a respective one of the booms 2 engages with its first end section 4 and is articulatedly connected with the same in the interior of the coupling means 6 or is articulated on the coupling means 6. Thus, each of the booms 2 can be tilted with respect to the coupling means 6 within a respective imaginary plane, wherein all three of these planes intersect in a longitudinal axis of the coupling means 6 or wherein the longitudinal axis of the coupling means 6 is associated with each of said planes. Each of these imaginary planes is subdivided into two sub-regions by the longitudinal axis of the coupling means 6, wherein the booms 2 in each case can be tilted within only one of these sub-regions of a respective plane. Since the three recesses 10 are formed at equal angular distances, both those sub-regions of the planes, in which the booms 2 move, as well as those sub-planes of the planes, in which the booms 2 do not move, form angles of 120° with one another.

The bearings 7, on the other hand, in each case have a base element or a base 11 and rotary element 12 arranged or placed thereon and rotatable about a vertical axis. In each case, a groove 13 is formed in the rotary element 12, wherein in each case a boom 3 engages with its second end section 5 into the groove 13 of a respective one of the rotary elements 12 and is rotatably mounted or articulated within the same about a horizontal axis. Thus, as a result of the rotatability of the rotary elements 12 each of the booms 2 is articulatedly and rotatably mounted with its second end section 5 in a respective one of the bearings 7.

Since each rotary element 12 about the vertical axis in principle can describe a full circle and the boom 2 articulated on the rotary element 12 can describe a half circle about the horizontal axis, the booms 2 in the absence of coupling means 6, even if their first end sections 4 are not coupled with one another, can be pivoted in the entire space above a subsurface supporting or bearing the lifting device 1. However, all booms 2 are coupled with one another as a result of the coupling means 6, on the one hand, with their first end sections 4 and, on the other hand, as a result of the fixing of the positions of the bearings 7 relative to one another, in which in each case their second end sections 5 are mounted. None of the booms 2 can therefore be pivoted or can be changed in its length, without this affecting the other booms 2 and the other booms 2 also performing corresponding length changes or pivotings or movements or following these. As a result of this interaction between the booms 2, which is a consequence of their length adjustability, the articulated connection of their first end sections 4, the articulated and rotatable mounting of their second end sections 5 in bearings 7 positioned relatively fixedly to one another and the rotatability of the booms 2 in themselves or the first end sections 4 and the second end sections 5 relative to one another, a forced guidance of the respective two other booms 2 occurs in the event of a length change of one of the booms 2 in the lifting device 1. Above all, however, this interaction of the three booms 2 ensures a high pivotability or mobility of the lifting device 1 with constantly high rigidity values of the overall system. The coupling means 6 thereby rolls off in the space when the lifting device 1 is pivoted, specifically once for each rotation of the lifting device around a full circle in the azimuthal direction.

In addition, the lifting device 1 at all times for every position of the booms 2 coupled with one another, therefore, regardless of how the booms 2 are exactly pivoted or positioned, assumes the shape of a mostly oblique tetrahedron, the surfaces of which are delimited or enclosed by the booms 2 and the stabilizing elements 8 between the bearings 7. The booms 2 thus always form, regardless of their specific position, a tripod or three-footed tripod or three-legged tripod, which gives the lifting device 1 overall a high stability. When lifting loads, the elongated booms 2 are thus only loaded by tensile- and compressive forces and not by bending forces. Overall, this results in a very high overall rigidity for the lifting device 1. For these reasons, substantially heavier loads can be lifted with the lifting device 1 than with known cranes, wherein the booms 2 of the lifting device 1 can be extended even when lifting very heavy loads to their greatest possible length and heavy loads can therefore also be moved over comparatively long distances.

The lifting device 1 shown in FIG. 1 is intended to be arranged on any subsurface, such as, for example, the ground. It can thereby simply rest on the subsurface or ground or else be anchored with the subsurface or ground. Since lifting devices or cranes often have to be used at different locations, it is advantageous if the lifting device or the crane can change the location as easily as possible or is mobile.

Figure 2:
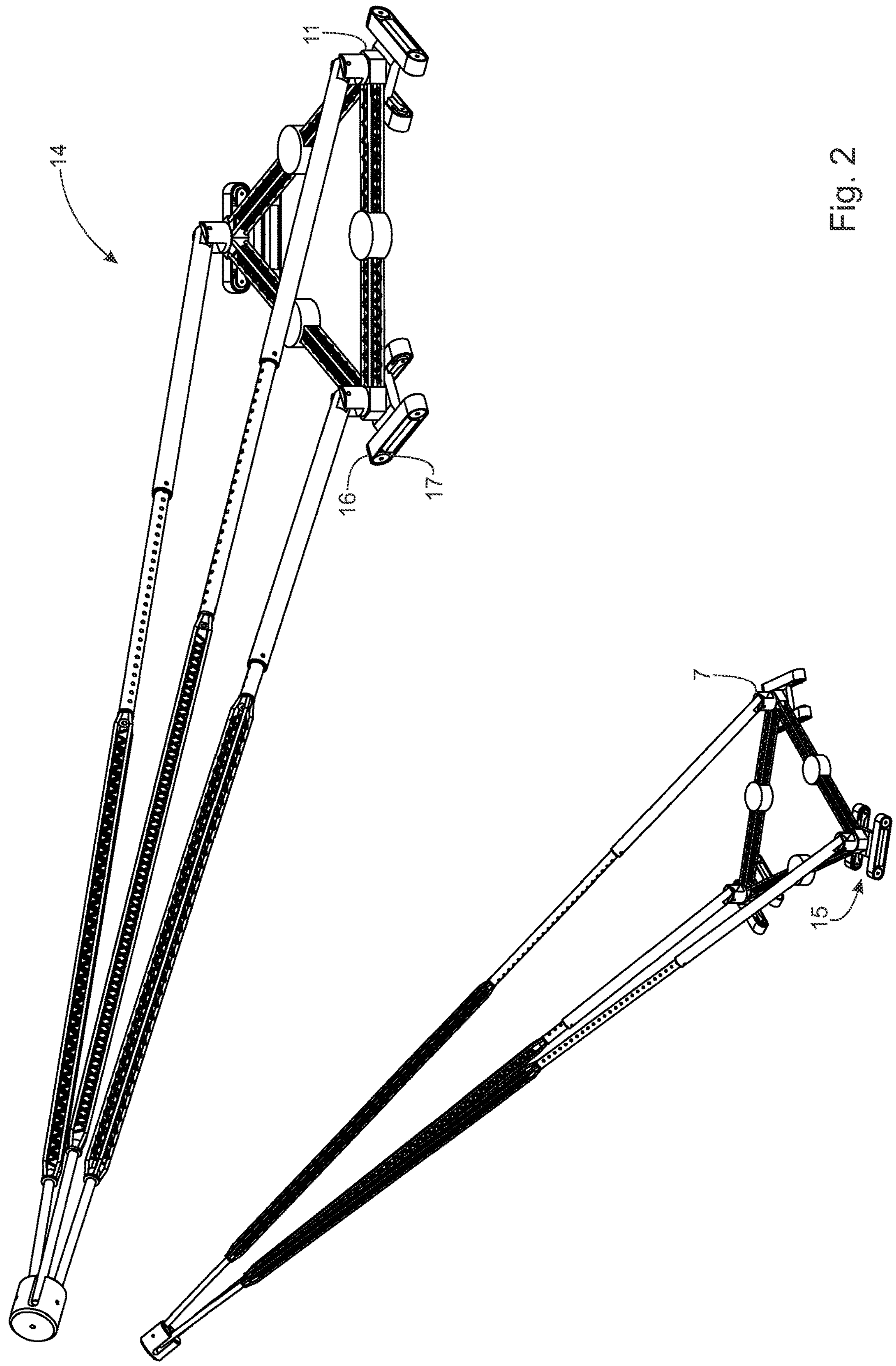
FIG. 2 shows a mobile lifting device.

FIG. 2 shows such a mobile lifting device 14. The lifting device 14 corresponds in its design to that of the lifting device 1 of FIG. 1. However, in contrast to the latter in the case of the lifting device 14 the bearings 7 are arranged on movable or mobile bases. Said movable bases are in the present case crawler chassis 15. It is understood that the movable bases can also be designed differently, for example, as so-called Self Propelled Modular Transporter or SPMT. Each bearing 7 or each base 11 is thereby rotatable about a vertical axis with respect to the respective crawler chassis 15, on which it is arranged. Each of the crawler chassis 15 has in each case a pair of crawler chains with two parallel crawler chains 16, which are looped around rollers 17 and can optionally be moved around these rollers 17 in the same direction or in opposite directions. Moving the crawler chains 16 of a pair of crawler chains in opposite directions causes a rotation of the respective crawler chassis 15 about its vertical axis or about a vertical axis of rotation. However, the respective bearing 7 arranged on said crawler chassis 15 is prevented from following the rotation of the crawler chassis 15 due to its coupling by the stabilizing elements 8 with the adjacent bearings 7. Thus, the crawler chassis 15 can be rotated freely under the bearing 7 in any direction of rotation. In this way, it is, for example, possible to bring all three crawler chassis 15 into the positions shown in FIG. 2, in which their respective pair of crawler chains are aligned at an angle to one another, so that the lifting device 14 can be rotated as a whole. To move the lifting device 14 in a straight line, the pair of crawler chains are aligned in the same way, so that they are substantially parallel to one another.

Figure 3:
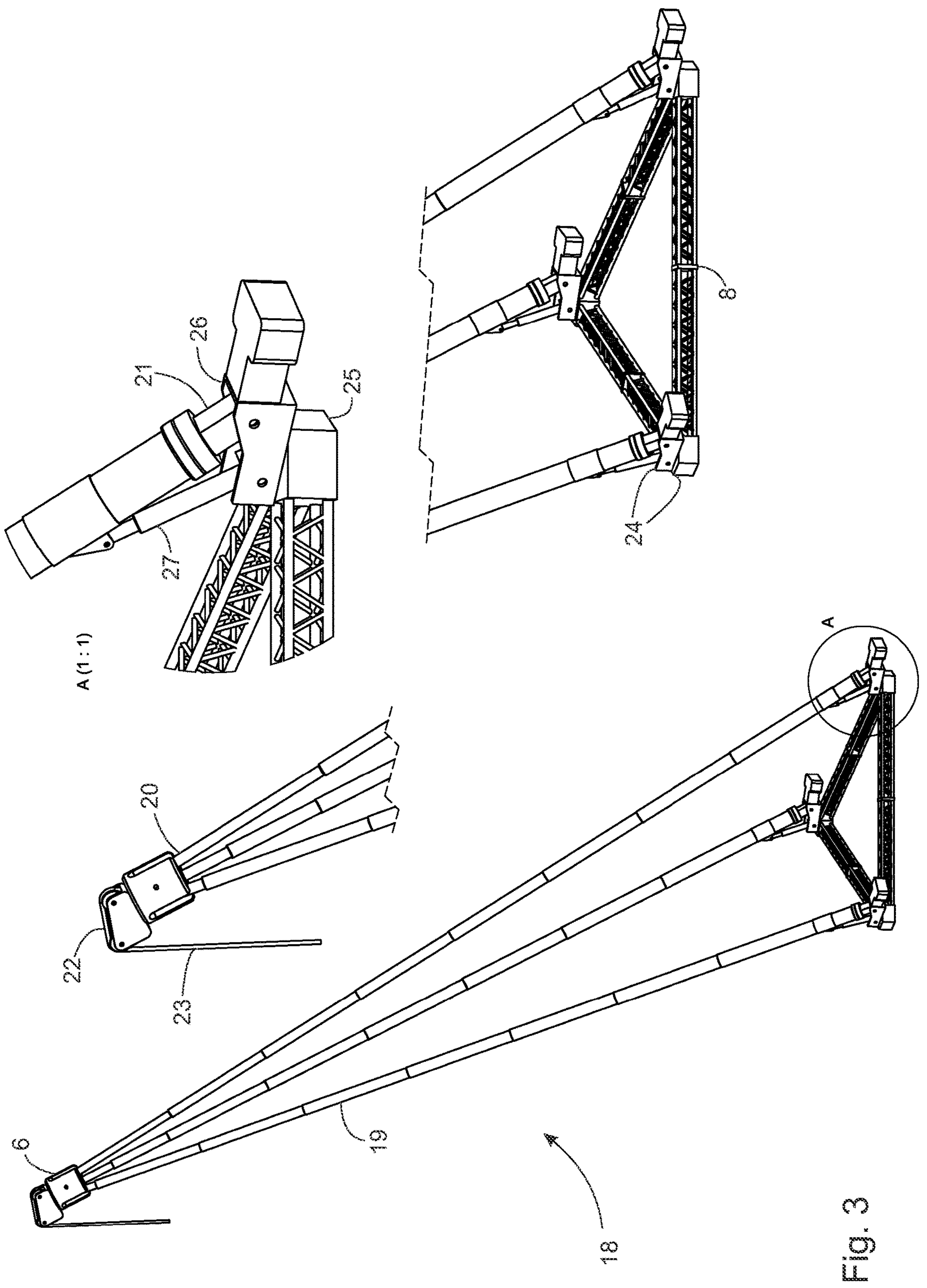
FIG. 3 shows a further lifting device.

FIG. 3 in turn shows a stationary or non-mobile lifting device 18 with three telescopically displaceable booms 19 with first end sections 20 and second end sections 21. However, the booms 19, in contrast to the booms 2 of the lifting device 1 shown in FIG. 1, have not only two, but rather a plurality of telescopic elements per boom 19, which can be telescopically pushed into one another. Furthermore, the booms 19 are designed without fixed lattice jibs. As in the case of the lifting device 1, the first end sections 20 are articulatedly connected to one another by means of a coupling means 6. In contrast to in FIGS. 1 and 2, in FIG. 3 a guide device 22 arranged on the coupling means 6 of the lifting device 18 for a carrying cable 23 can be seen, which is provided for lifting and bearing loads. The guide device 22 is thereby arranged rotatably with respect to the coupling means 6 or articulatedly on the coupling means 6, so that when the lifting device 18 is rotated, the guidance of the carrying cable 23 is not impaired. Above all, however, the lifting device 18 differs from the lifting device 1 by differently designed bearings 24, in which in each case the second end sections 21 are articulatedly mounted. Indeed, the bearings 24 of the lifting device 18 also have a base 25 and a rotary element rotatably mounted on the base 25 about a vertical first axis, which in the present case is designed as an upper structure 26 of known mobile cranes. However, the booms 19 are now rotatably mounted with their respective second end sections 21 in the respective bearings 24 about a horizontal second axis, which does not intersect the first axis, about which the rotary element or the upper structure 26 is rotable, or is oriented skewed to it. To pivot the booms 19 about this horizontal second axis, the bearings 24 have respective hydraulically or pneumatically operated actuators 27. As in the case of the lifting device 1, the bearings 24 are connected to one another by lattice-shaped stabilizing elements 8 of square cross-section resting on the ground or subsurface, the opposite ends of which are connected to respective bases 25 of bearings 24, which are adjacent to one another. In this way, the bearings 24 are fixed in their positions relative to one another or the positions or arrangements of the bearings 24 are unchangeable relative to one another. The bearings 24 thereby assume positions in the present case at the corners of an equilateral triangle.

In order to fix the positions of the bearings relative to one another at unchangeable positions, it is not absolutely necessary to connect the bearings to one another. As an example of this, in FIG. 4 a lifting device 28 is shown, which manages without stabilizing elements and which, with the exception of the bearings 29, is otherwise identical in its structure to the lifting device 18 of FIG. 3. While the bearings 29 have respective upper structures 26 identical to the rotary elements or upper structures 26 of the bearings 24 of the lifting device 18, base elements or bases 30, on which the upper structures 26 are rotatably arranged about a vertical axis, are designed so as to be extended in a spur-like manner. The spur-like bases 30 are provided as ground anchors or as soil anchors and can be sunk in a subsurface bearing the lifting device 28 such as, for example, the ground and anchored therein, so that the positions of the bearings 29 are unchangeably fixed relative to one another, without the bearings 29 being directly connected to one another for this purpose. Furthermore, the lifting device 28 can be anchored or fastened by means of bases 30 to a suitable base such as, for example, a concrete foundation, a concrete base or a concrete slab.

Figure 4:
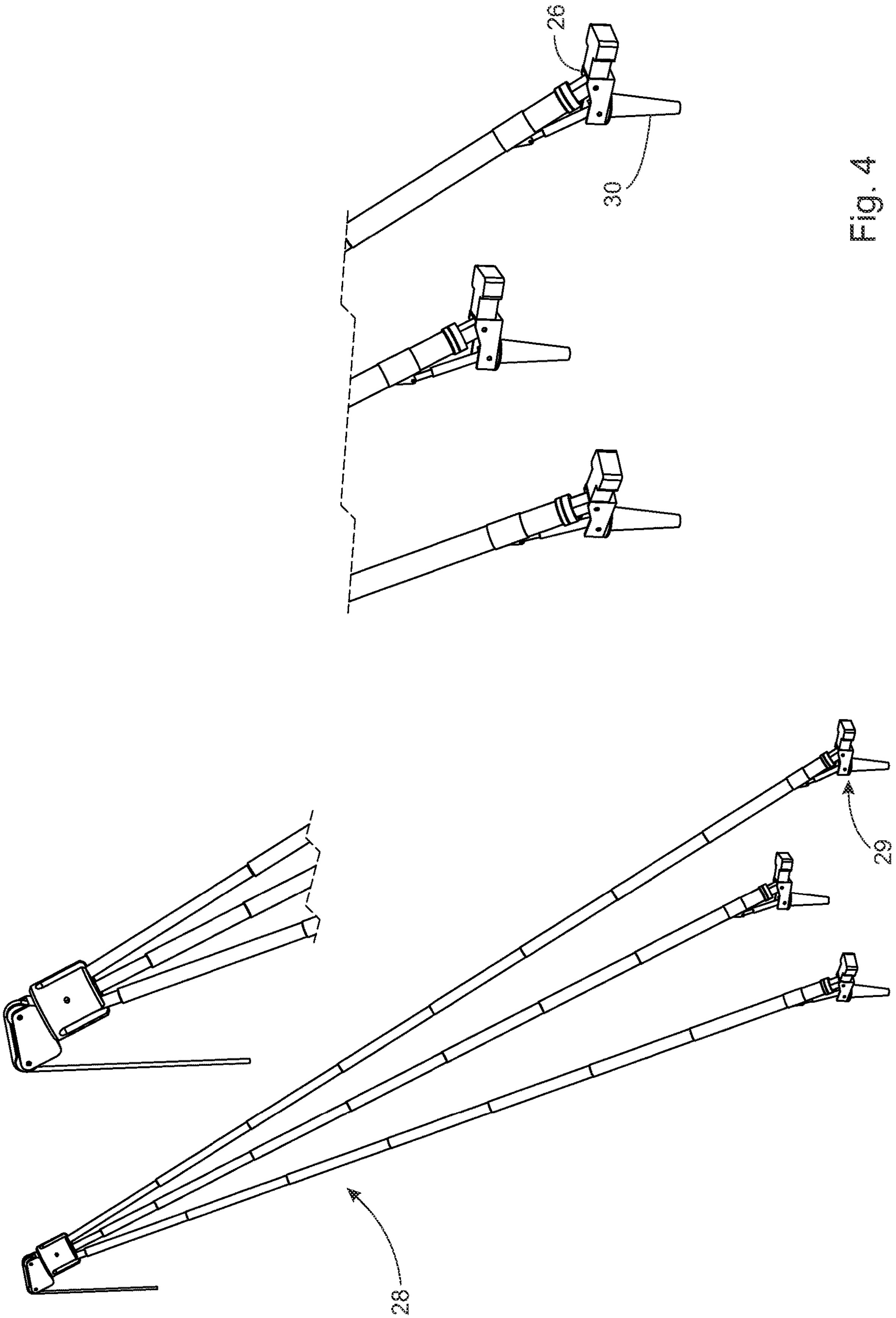
FIG. 4 shows a lifting device which can be anchored in the ground.
Figure 5:
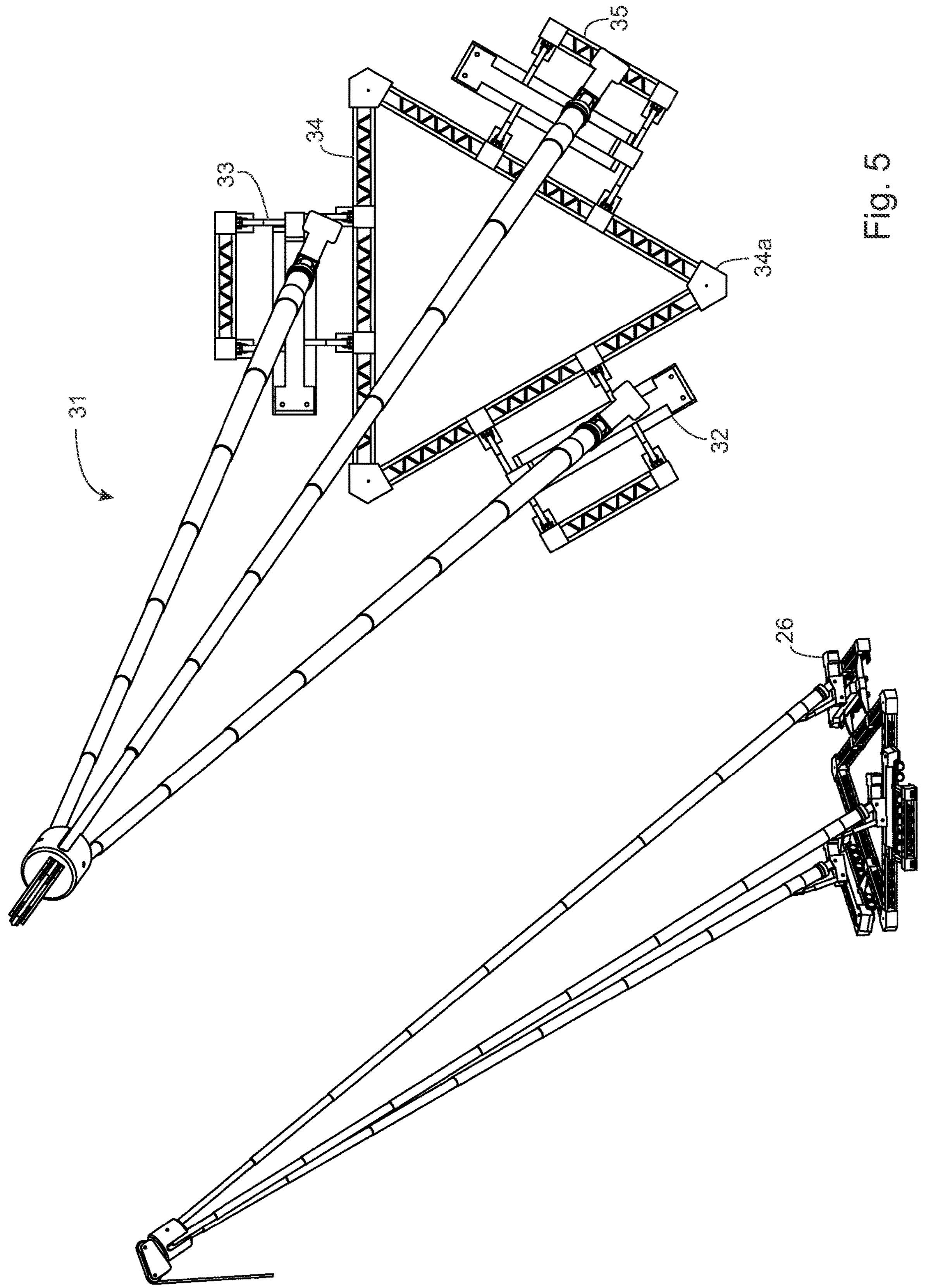
FIG. 5 shows a lifting device composed of vehicle cranes coupled with one another.

As a further example of a mobile lifting device, FIG. 5 shows a lifting device 31, which is identical in its structure to the lifting device 28 shown in FIG. 4 except for the bases 32 bearing the rotary elements or upper structures 26 and their fixation to one another. In contrast to the lifting device 28, in the case of the lifting device 31 respective undercarriages of known mobile cranes are provided for bearing the rotary elements or upper structures 26 and thus as bases 32 for bearings formed from the rotary elements or upper structures 26 and the bases 32. As in the case of known mobile cranes, usually the undercarriages or bases 32 in each case have two support beams 33 on both sides, on the free ends of which in each case a support cylinder or a pressure spindle is provided for the additional support of the undercarriage or the base 32. The rotary elements or upper structures 26 are thereby rotatably arranged as upper structures of known mobile cranes on the respective undercarriages or bases 32. To fix the positions of the undercarriages or bases 32 relative to one another, three elongated, lattice-shaped stabilizing elements 34 are provided, which are arranged forming a equilateral triangle and are connected to one another by means of connecting means **34*a* located at the corners of the triangle. The length of the stabilizing elements 34 thereby exceeds that of the undercarriages or bases 32, each of which is arranged outside of the triangle parallel to a respective one of the stabilizing elements 34 and is connected to it via the support cylinder or the pressure spindle. For further support, on the sides of the undercarriages or bases 32 facing away from the stabilizing elements 34 shorter stabilizing elements 35 extend parallel to the respective undercarriages or bases 32, where they, like the stabilizing elements 34, are connected to the support cylinders or pressure spindles of the support beams on this side of the undercarriages or of the bases 32. Both the stabilizing elements 34 as well as the connecting means 34*a* and the stabilizing elements 35 thereby rest on the subsurface or on the ground bearing the lifting device 31. In order to increase the stability of the lifting device 31 even further, in particular, the connecting means 34*a* can be particularly heavy or designed as ballast bodies. Optionally, the stabilizing elements 35** can also be dispensed with.

The lifting device 31 of FIG. 5 entails the particular advantage that it can be assembled or constructed at any location without great effort by suitably coupling or connecting known mobile cranes. While, for example, the structure of a lattice mast crawler crane is cumbersome and requires a great effort and a lot of time, the lifting device 31 can be produced conveniently and in a simple and rapid manner by suitable arrangement or placement of three known mobile cranes and their connection by means of a coupling means 6 and stabilizing elements 34.

Figure 6:
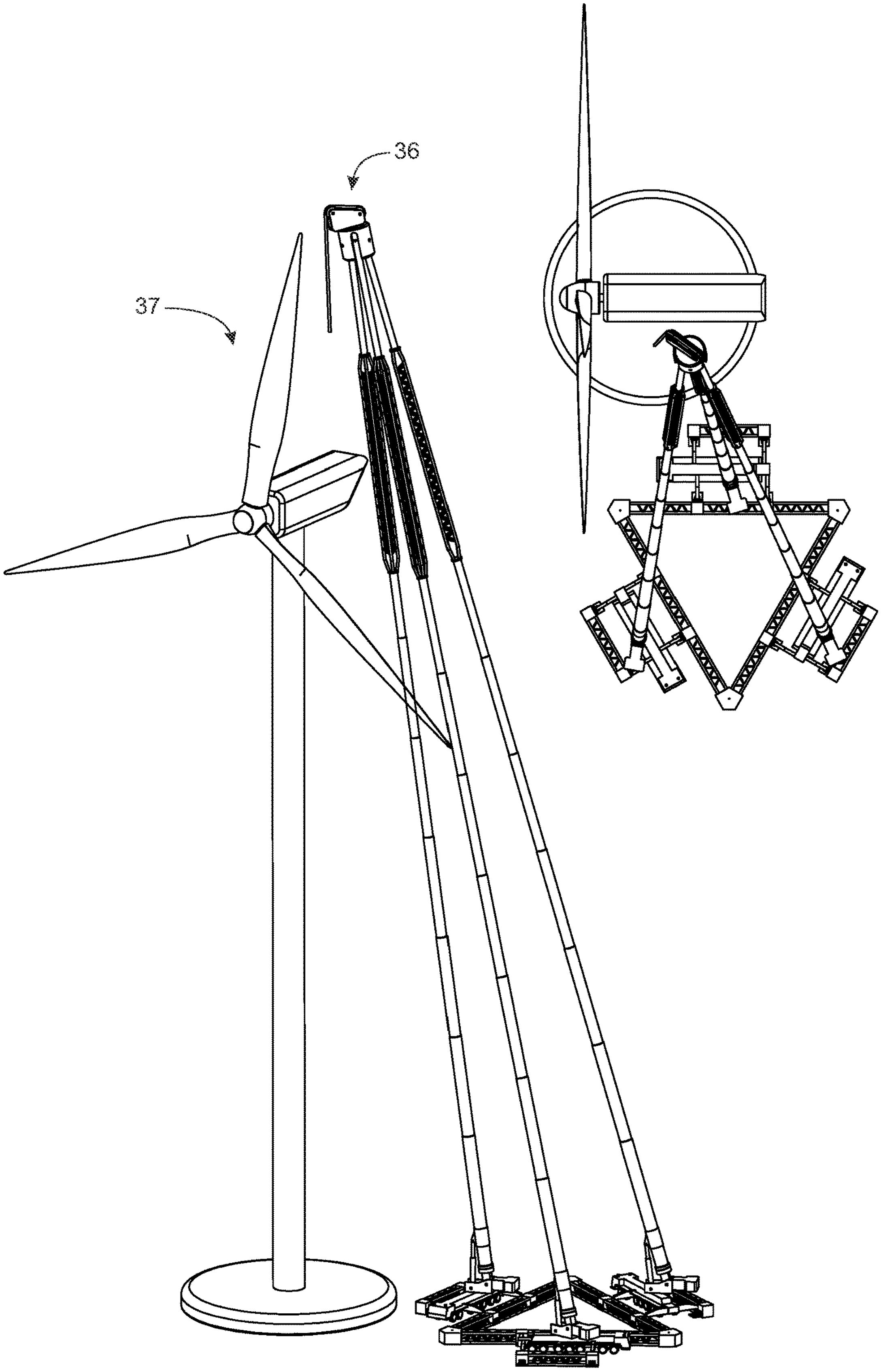
FIG. 6 shows the lifting device of FIG. 5 with the wind power plant.

FIG. 6 shows an example of the use of a lifting device 36 composed of three known mobile cranes, in which the erection of a wind power plant 37 by means of the lifting device 36 is shown once in a spatial representation and once in a top view. As a result of the height of such wind power plants 37 and weight of their components, in practice special cranes are necessary for their construction, such as, for example, the above-mentioned lattice mast crawler cranes. Such special cranes can, however, be provided for the construction of wind power plants 37 only with difficulty and with a great deal of effort. All of these difficulties do not arise with lifting device 36 composed of three known mobile cranes coupled with one another.

Figure 7:
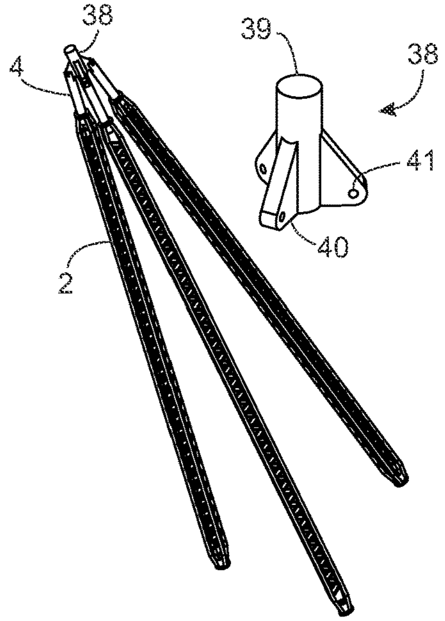
FIG. 7 shows a coupling unit with a cylindrical central body.

In all previous embodiments, in each case the same coupling means 6 was used for the articulated connection of the first end sections of the booms. In FIG. 7, a differently designed coupling means 38 can now be seen. The coupling means 38 essentially consists of a cylindrical central body 39, from the lateral surface of which three fin-shaped or fin-like projections 40 protrude at equal angular distances. Each projection 40 is provided with a through-bore 41, so that a first end section 4 of a respective boom 2 can be articulated on each of the projections 40.

Figure 8:
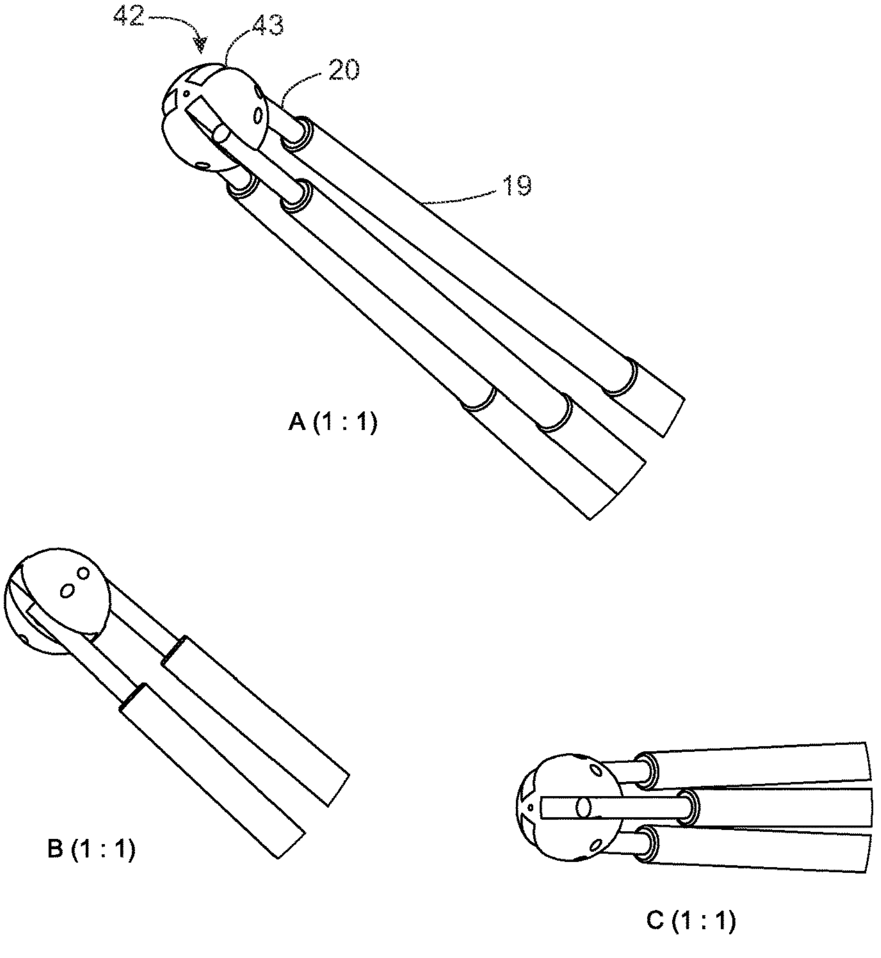
FIG. 8 shows a spherical coupling unit.

In contrast, a spherical coupling means 42 is shown in FIG. 8 in three different views. At equal angular distances, the coupling means 42 has groove-like recesses or grooves 43, in which respective first end sections 20 of booms 19 engage and are connected articulatedly to the coupling means 42 or are articulated therein.

In contrast, a coupling means 44 is shown in FIG. 9, which has three sub-elements 45, which are arranged successively along an axis of rotation. All three sub-elements 45 are rotatable about this axis of rotation. In each case, a first end section 20 of a boom 19 is articulatedly connected to a respective one of the sub-elements 45, in the present case by means of a fork joint. All three first end sections 20 are thereby rotatable about respective axes of rotation oriented parallel to one another, transversely to the axis of rotation of the sub-elements 45.

Instead of simple lattice-shaped stabilizing elements, mobile cranes coupled to a lifting device 46 can also be fixed relative to one another in their position by means of a more complex stabilizing device 46*a*, as FIG. 10 shows by way of example. In the case of the stabilizing device 46*a*, a respective receptacle 48 is provided for each undercarriage 47, into which the undercarriage 47 can retract and in which the undercarriage 47 is fixed or fastened. For this purpose, the receptacle 48 can be equipped, for example, with a clamping mechanism. The receptacles 48 are in turn connected by means of rods 49, which in the present case are variable in length, and thus fixed relative to one another in their positions.

Figure 11:
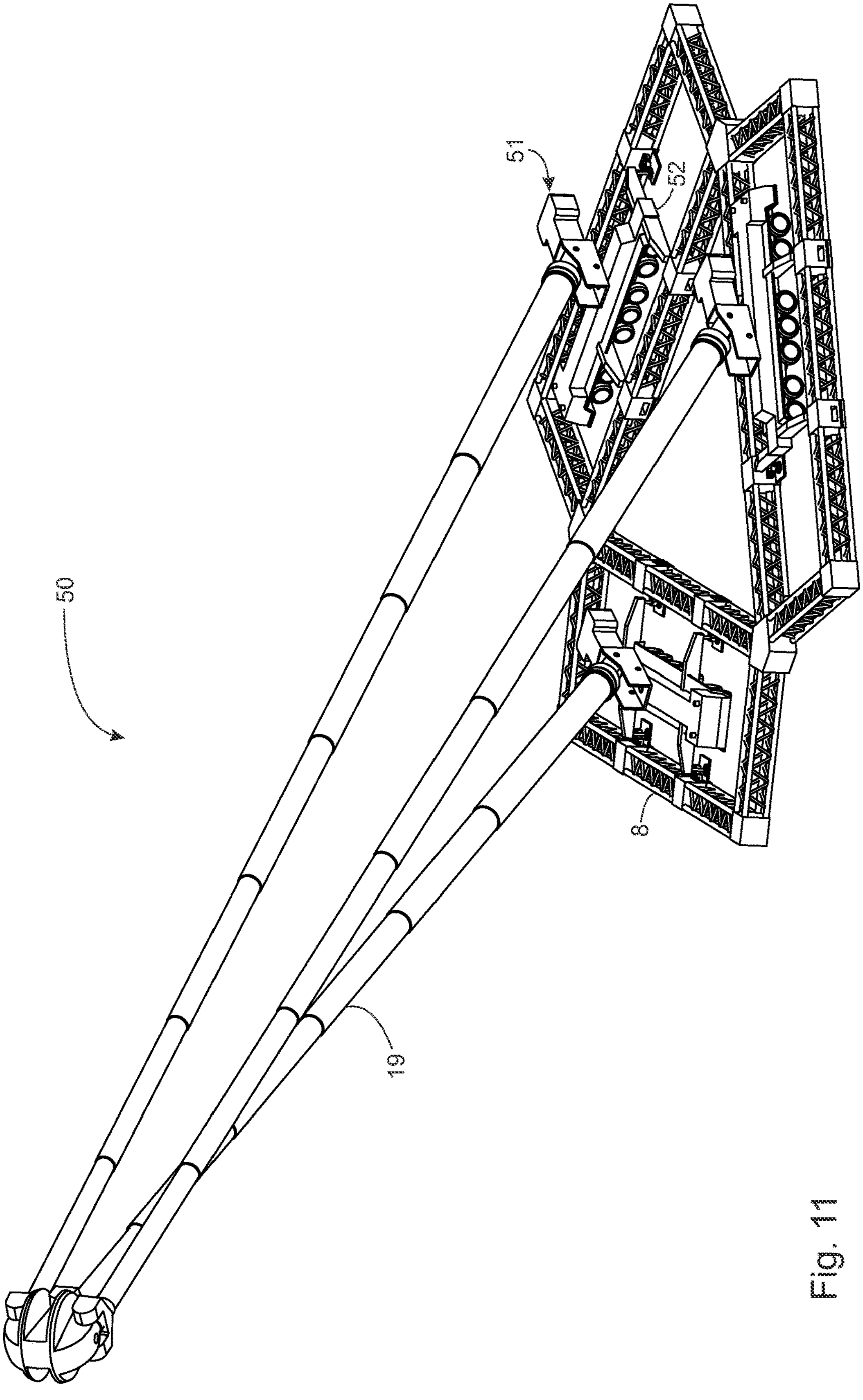
FIG. 11 shows a lifting device with circumferentially stabilized vehicle cranes.

FIG. 11 also shows three mobile cranes 51 coupled to a lifting device 50 with respective undercarriages 52. Each undercarriage 52 is located within a rectangle formed from stabilizing elements 8 resting on the ground or subsurface, wherein stabilizing elements 8 oriented parallel to the longitudinal axis of the respective undercarriage 52 are connected on support cylinders or pressure spindles of the same to said undercarriage. As a result of the rectangle formed from stabilizing elements 8 and connected to the undercarriage 52, the effective contact surface and thus its tilt resistance or stability is increased for each undercarriage 52. In addition, all three of the rectangles formed from stabilizing elements 8 are connected to one another in such a manner that in each case one of the stabilizing element 8 oriented parallel to the longitudinal axis of the respective undercarriage 52 forms a side of an equilateral triangle. As a result of this connection between the rectangles, the positions of the undercarriages 52 are also fixed relative to one another, whereby the unchangeable fixing of the bearings, which is necessary for the lifting device 50, is achieved for the booms 19 of the same.

As can already be seen by means of the previously described embodiments, stabilizing elements 8 can be combined with one another in a variety of ways, in order, on the one hand, to fix the individual bearings of a lifting device or their positions relative to one another and in order, on the other hand, to increase the stability of the entire lifting device. Some of these possibilities are shown in FIGS. 12*a*)-*d*).

Figure 12:
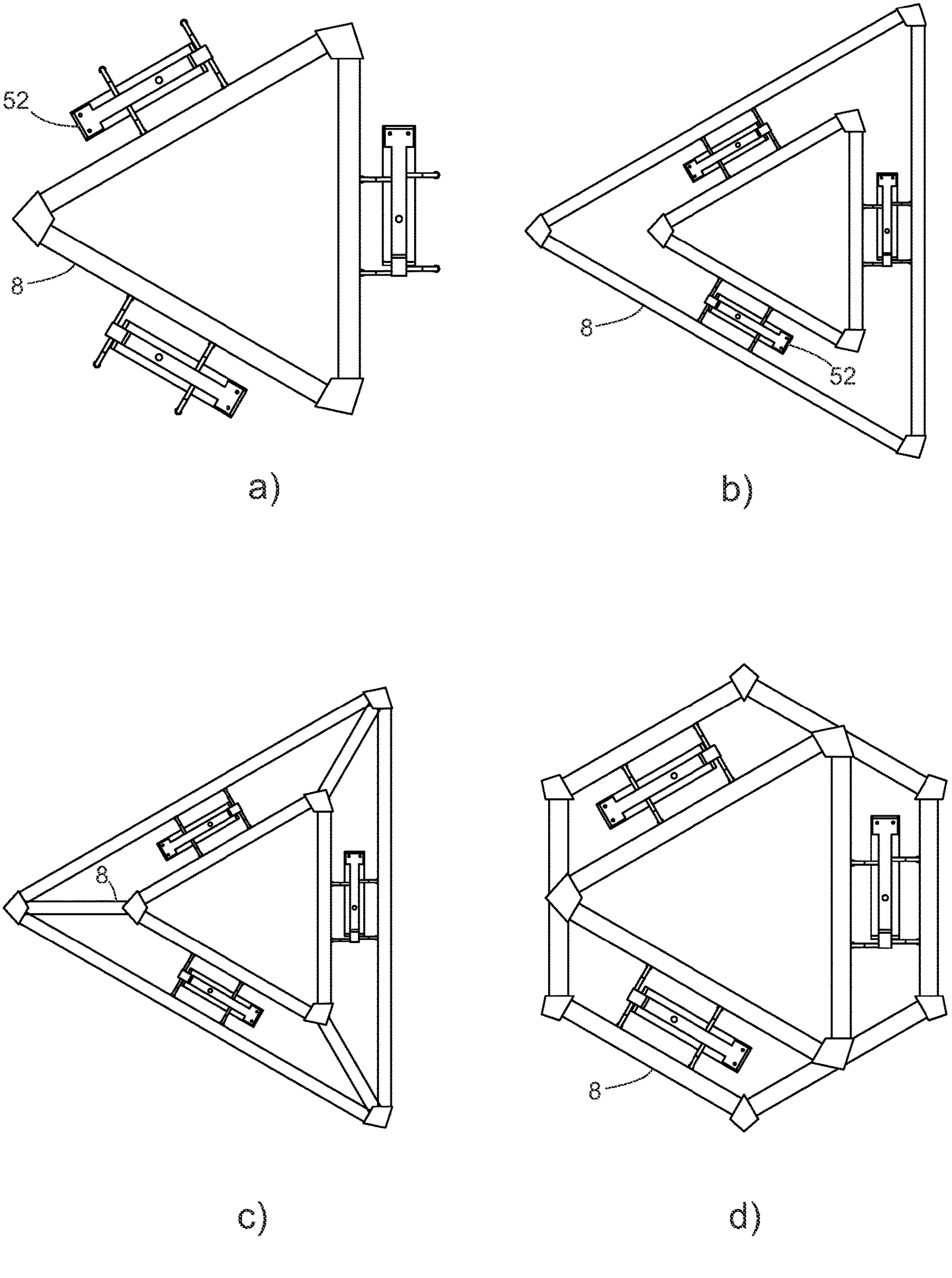
FIG. 12 shows undercarriages with differently configured stabilizing devices.

Thus, for example, FIG. 12*a*) shows three undercarriages 52 of respective mobile cranes, which are coupled with one another as base elements or bases of respective bearings of a lifting device by means of stabilizing elements 8 and are thus fixed in their positions relative to one another. The stabilizing elements 8 are thereby connected to one another to form an equilateral triangle and each of the undercarriages 52 is arranged outside this triangle and is connected to a respective one of the stabilizing elements 8. This configuration corresponds substantially to the configuration of the stabilizing elements 35 in FIG. 5, wherein, however, the stabilizing elements 35 present in FIG. 5 are missing in the configuration of FIG. 12*a*).

In FIG. 12*b*), the configuration of FIG. 12*a*) is additionally surrounded by an outer triangle formed from stabilizing elements 8 or the configuration shown in FIG. 12*a*), including the three undercarriages 52, is arranged within an outer triangle formed from stabilizing elements 8, wherein each of the undercarriages 52 is connected to a respective one of the stabilizing elements 8 of the outer triangle.

The configuration shown in FIG. 12*c*) also has an inner and an outer triangle formed from stabilizing elements 8. However, to increase the overall stability, respective opposite vertices of the outer and of the inner triangle are connected to one another by additional stabilizing elements 8.

Finally, in FIG. 12*d*), the configuration of FIG. 12*a*) is surrounded by a hexagon formed from six stabilizing elements 8 connected to one another instead of an outer triangle, or the configuration of FIG. 12*a*) is located entirely within such a hexagon. Three stabilizing elements 8 of the hexagon extending parallel to respective longitudinal axes of the undercarriages 52 are thereby connected to the undercarriages 52, while each of the three remaining stabilizing elements 8 is connected to respective vertices of the inner triangle abutting centrally on the same.

Figure 13:
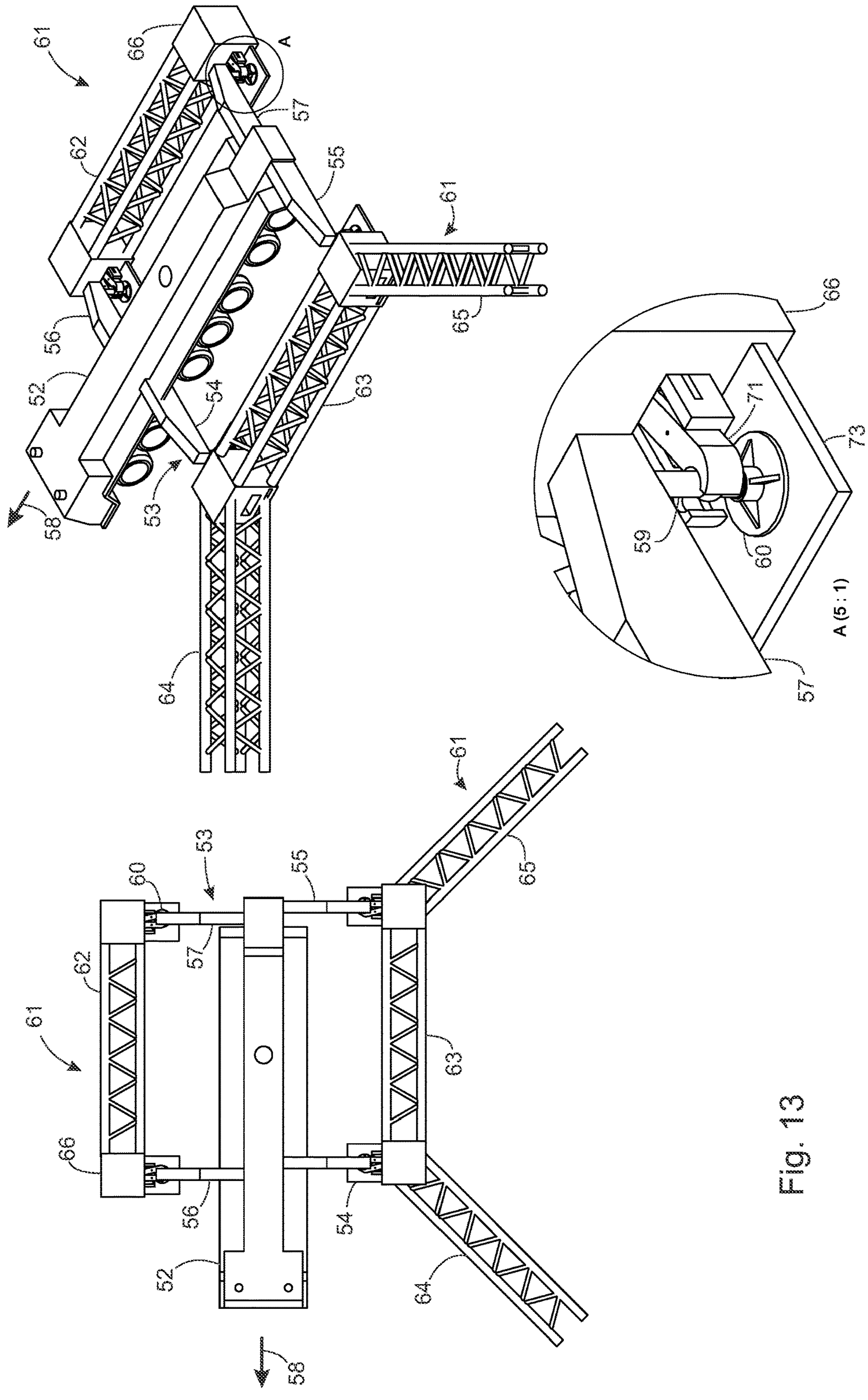
FIG. 13 shows a stabilizing device.

To clarify the connection between the stabilizing devices and the undercarriages, which is repeatedly mentioned above, one of the previously described undercarriages 52 can be seen again in FIG. 13, once in a spatial representation and once in a top view. For its additional support, the undercarriage 52 has a support device 53, to which four support beams 54, 55, 56, 57 belong. From these support beams 54, 55, 56, 57, with respect to a direction of travel 58 of the undercarriage 52, a first support beam 54 and a second support beam 55 extend from a left side of the undercarriage 52 and a third support beam 56 and a fourth support beam 57 extend from a right side of the undercarriage 52. On a free end of each of the support beams 54, 55, 56, 57 facing away from the undercarriage 52 in each case a pressure spindle or a support cylinder 59 with a support plate 60 is arranged, by means of which the undercarriage 52 is supported.

In order to further increase the stability of the undercarriage 52 and thus of a lifting device having the undercarriage 52, a stabilizing device 61 is connected to the support device 53 of the undercarriage 52. The stabilizing device 61 has a total of four stabilizing- or basic elements 62, 63, 64, 65 designed as elongated lattice structures with a square cross-section and connecting means 66, with which the basic elements 62, 63, 64, 65 are detachably connected to the respective support cylinder 59 of the support device 53. Thus, respective connecting means 66 are provided at the opposite ends of the first basic element 62, with which connecting means the first basic element 62 is detachably connected to the respective support cylinders 59 of the third support beam 56 and of the fourth support beam 57. Correspondingly, respective connecting means 66 are provided on the opposite ends of the second basic element 63, with which connecting means the second basic element 63 is detachably connected to the respective support cylinders 59 of the first support beam 54 and of the second support beam 55. In addition, at the same time a respective end of the third basic element 64 and of the fourth basic element 65 is arranged on the latter connection means 66, so that the third basic element 64 is attached to the connecting means 66 connected to the support cylinder 59 of the first support beam 54 and the fourth basic element 65 is attached to the connecting means 66 connected to the support cylinder 59 of the second support beam 55. Thus, the third basic element 64 as well as the second basic element 63 are connected with the same connecting means 66 to the support cylinder 59 of the first support beam 54 and the fourth basic element 65 as well as the second basic element 63 are connected with the same connecting means 66 to the support cylinder 59 of the second support beam 55.

All the basic elements 62, 63, 64, 65 are thereby horizontally oriented, which means that their longitudinal axes are horizontally aligned. While the longitudinal axes both of the first basic element 62 as well as of the second basic element 63 extend parallel to the longitudinal axis of the undercarriage 52, which in turn coincides with the direction of travel 58, the respective longitudinal axes of the third basic element 64 and the fourth basic element 65 enclose an angle both with the longitudinal axes of the first basic element 62 and of the second basic element 63 as well as with the longitudinal axis of the undercarriage 52 or with its direction of travel 58 or they are obliquely aligned to these.

The stabilizing device 61 for different reasons has an advantageous effect on the steadfastness or stability of the lifting device, which has the undercarriage 52. Thus, on the one hand, as a result of the first basic element 62 and of the second basic element 63, the rigidity of the undercarriage 52 itself is increased. On the other hand, the third basic element 64, which extends obliquely away from the undercarriage 52, and the second basic element 63 bring about an enlargement of the effective contact surface of the lifting device or they bring about an additional support on the subsurface, which bears the undercarriage 52. Overall, the lifting device is thus stabilized substantially better than it would be without the stabilizing device 61. For example, with a suitable connection between stabilizing device 61 and support device 53 a lifting device stabilized with the stabilizing device 61 can lift substantially heavier loads with substantially further outreach than the same lifting device could lift without the stabilizing device 53.

Figure 14:
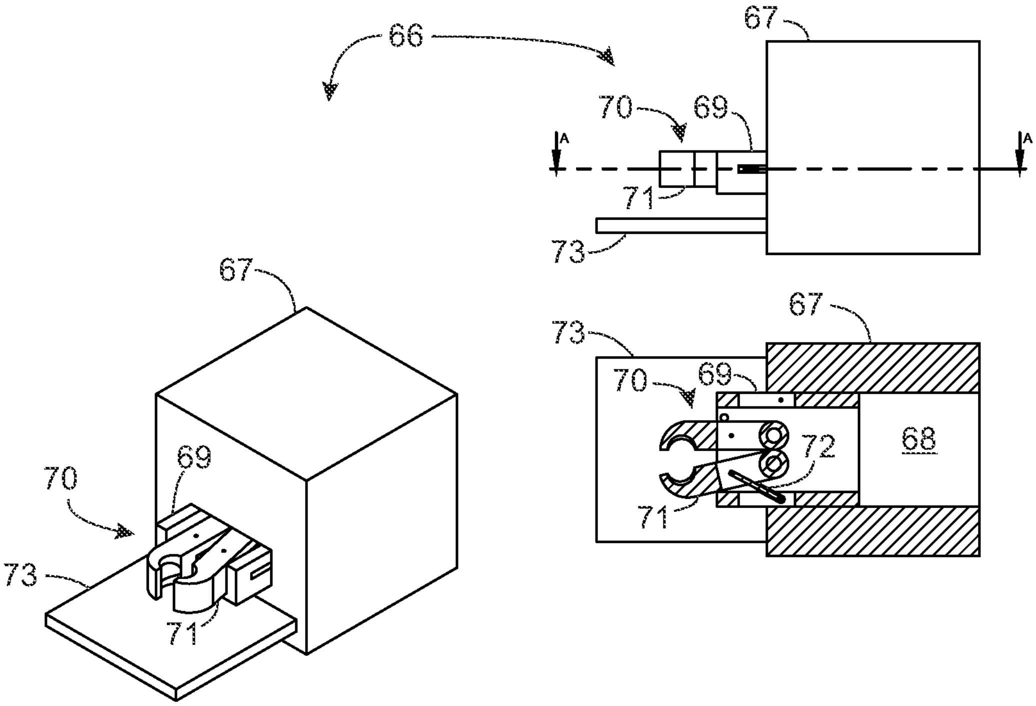
FIG. 14 shows an extendable gripping device.

FIG. 14 shows one of the connecting means 66 once in a spatial view, a side view and a top view of a section through the connecting means 66 along the line A-A. The connecting means 66 has a substantially cube-shaped housing body 67 with an open cuboid cavity 68. In the cavity 68 a displaceable carriage 69 is arranged, which bears a pincer-like or clamp-like gripping means 70 with two articulated gripper arms 71. By means of an actuator 72, the gripping arms 71 can be transferred between a closed state, in which they grip an object located between the gripping arms 71 in a clamping manner, and an open state, in which they release the object. In FIG. 14, the carriage 69 is shown in a state extended out of the housing body 67. If the connecting means 66 is not used, then the carriage 69 including the gripping means 70 can be retracted into the housing body 67, so that the carriage 69 and the gripping means 70 are completely accommodated within the cavity 68. Furthermore, the connecting means 66 has a projecting plate-shaped element or plate element 73 on that side of the housing body 67, on which the carriage 69 extends out of the housing body 67. This plate element 73 is arranged offset from the extended carriage 69 towards the subsurface and is oriented parallel to said subsurface and is thus spaced apart from the extended carriage 69 in a vertical direction towards the subsurface.

In order now by means of the connecting means 66 to connect one of the basic elements 62, 63, 64, 65 coupled or connected to the said connecting means in any manner to the support device 53 of the undercarriage 52, initially one of the support plates 60 of the support device 53 is arranged on the plate element 73, while the carriage 69 assumes the rest position, in which the carriage 69 and the gripping means 70 are completely retracted within the housing body 67. The carriage 69 is then extended out of the housing body 67. During this process the gripping arms 71 assume the open state. In the extended state of the carriage 69, the support cylinder 59 connected to the support plate 60 is located between the gripping arms 71. Said gripping arms are now transferred by means of the actuator 72 into the closed state and clamp the support cylinder 59 between them, whereby the connection is established between the support cylinder 59 and the gripping means 70 and thus between the support device 53 and the connecting means 66 or the respective basic element 62, 63, 64, 65. To release this connection, the gripping arms 71 are transferred into the open state by the actuator 72, whereby the support cylinder 59 is released, and the carriage 69 retracts again together with the gripping means 70 into the housing body 67.

LIST OF REFERENCE SIGNS

1 lifting device
2 boom
3 telescopic element
3*a* fixed lattice jib
4 first end section
5 second end section
6 coupling means
7 bearing
8 stabilizing element
9 weight body
10 recess
11 base
12 rotary element
13 groove
14 lifting device
15 crawler chassis
16 crawler chain
17 roller
18 lifting device
19 boom
20 first end section
21 second end section
22 guide device
23 carrying cable
24 bearing
25 base
26 upper structure
27 actuator
28 lifting device
29 bearing
30 base
31 lifting device

32 base
33 support beam
34 stabilizing element
**34*a*** connecting means
35 stabilizing means
36 lifting device
37 wind power plant
38 coupling means
39 central body
40 projection
41 through-bore
42 coupling means
43 groove
44 coupling means
45 sub-element
46 lifting device
**46*a*** stabilizing element
47 undercarriage
48 receptacle
49 rod
50 lifting device
51 mobile crane
52 undercarriage
53 support device
54 first support beam
55 second support beam
56 third support beam
57 fourth support beam
58 direction of travel
59 support cylinder
60 support plate
61 stabilizing device
62 first basic element
63 second basic element
64 third basic element
65 fourth basic element
66 connecting means
67 housing body
68 cavity
69 carriage
70 gripping means
71 gripper arm
72 actuator
73 plate element

The invention claimed is:

1. A lifting device having three booms of adjustable length, which in each case have a first end section and a second end section opposite the first end section, in which
- the first end sections of all booms are articulatedly connected to one another and
- the second end sections are mounted articulatedly and rotatably in respective bearings, wherein
- the bearings are arranged at fixed positions relative to one another,
- in each boom at least the first end section can be rotated about the longitudinal axis of the boom with respect to the second end section,
- the second end section of each of the booms can be rotated, relative to the respective bearing, both about a respective first axis as well as about a respective second axis rotated about the first axis, wherein the respective first axis and the respective second axis intersect or are skewed with respect to one another, and
- the first end sections articulatedly connected to one another are movable within an azimuthal angular range comprising 360°.

2. The lifting device according to claim 1, in which at least one of the bearings is anchored in the ground and/or
- at least two of the bearings are connected to one another and/or
- at least two of the bearings are arranged and/or fixed on a same base and/or
- at least two of the bearings are arranged at different heights and/or
- at least one of the booms and/or one of the bearings is a part at least of one vehicle or is at least one vehicle.

3. The lifting device according to claim 1, having at least one coupling means, which connects the first end sections articulatedly with one another, wherein at least one of the first end sections is detachably connected to the coupling means.

4. The lifting device according to claim 3, in which the coupling means has at least three sub-elements arranged successively along an axis of rotation and rotatable about said axis of rotation, wherein, in each case, one of the first end sections is articulatedly connected to a respective one of the sub-elements.

5. The lifting device according to claim 3, provided with at least one guide device for at least one carrying cable, wherein the guide device is rotatably mounted on the coupling means.

6. The lifting device according to claim 1, having at least one stabilizing device, wherein the stabilizing device has at least one basic element with a longitudinal axis, which can be connected to at least one of the bearings in a substantially horizontal orientation, and has at least one connecting means for detachably connecting the basic element to the bearing.

7. The lifting device according to claim 6 having at least one weight body, which is provided for arrangement on the basic element.

8. The lifting device according to claim 7, in which the at least one weight body can be moved along the basic element to different positions.

9. The lifting device according to claim 6, having at least one housing body arranged on the basic element, in which housing body the connecting means is accommodated in a state of rest and from which the connecting means can be at least partially or completely extended or folded out.

10. The lifting device according to claim 6, having at least two basic elements, the longitudinal axes of which are aligned parallel to one another or at an angle to one another or are arranged at different heights.

11. The lifting device according to claim 1, wherein
- each of the bearings comprises a base element and a rotary element, wherein the rotary element is arranged or placed on the base element, rotatable about a vertical axis, and wherein the rotary element defines a groove, and
- the second end sections are mounted articulatedly in the respective bearings by being articulated, about a horizontal axis, within the grooves of the rotary elements.

12. A method for producing a lifting device having at least three booms of adjustable length, which in each case have a first end section and a second end section opposite the first end section, in which the method comprises
- articulatedly connecting the first end sections of all booms to one another,
- articulatedly and rotatably mounting the second end sections in respective bearings,
- wherein the bearings are fixed in their positions relative to one another, and wherein in each boom at least the first end section is designed to be rotatable about the longitudinal axis of the boom with respect to the second end section, wherein the second end section of of the booms is designed to be rotatable, relative to the respective bearing, both about a respective first axis as well as about a respective second axis rotated about the respective first axis, wherein the respective first axis and the respective second axis are designed to intersect or to be skewed with respect to one another, and wherein the first end sections articulatedly connected to one another are movable within an azimuthal angular range comprising 360°.

13. The method according to claim 12, in which at least one of the bearings is anchored in the ground and/or at least two of the bearings are connected to one another and/or at least two of the bearings are arranged and/or fixed on a same base and/or at least two of the bearings are arranged at different heights and/or at least one of the booms and/or one of the bearings are provided as part of at least one vehicle or as at least one vehicle.

14. The method according to claim 13, in which at least one of the bearings is provided as upper structure of a vehicle and the boom mounted therein is separated from a lift adjustment and a rotary drive of the upper structure.

15. The method according to claim 12, in which the first end sections are articulatedly connected with one another by means of a coupling means, wherein at least one of the first end sections can be detachably connected to the coupling means.

16. The method according to claim 12, in which at least one of the bearings is connected to at least one stabilizing device, which has at least one basic element with a longitudinal axis and at least one connecting means for detachably connecting the basic element to the bearing, wherein the basic element is oriented substantially horizontally.

17. The method according to claim 12, in which at least one of the booms is pre-tensioned or in which all booms are pre-tensioned.

18. The method according to claim 12, wherein each of the bearings comprises a base element and a rotary element, wherein the rotary element is arranged or placed on the base element, rotatable about a vertical axis, and wherein the rotary element defines a groove, and the second end sections are mounted articulatedly in the respective bearings by being articulated, about a horizontal axis, within the grooves of the rotary elements.

* * * * *